United States Patent
Singh et al.

(10) Patent No.: US 11,741,504 B2
(45) Date of Patent: Aug. 29, 2023

(54) PARAMETRIC TRACKING AND TRIGGERING OF ADVERTISING EVENTS IN ONLINE MULTIMEDIA ENVIRONMENTS

(71) Applicant: Catalina Marketing Corporation, St. Petersburg, FL (US)

(72) Inventors: Zubin Singh, St. Petersburg, FL (US); Terrance Snyder, St. Petersburg, FL (US); Kevin Hunter, La Jolla, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 109 days.

(21) Appl. No.: 16/429,733

(22) Filed: Jun. 3, 2019

(65) Prior Publication Data

US 2019/0370867 A1 Dec. 5, 2019

Related U.S. Application Data

(60) Provisional application No. 62/680,505, filed on Jun. 4, 2018.

(51) Int. Cl.
*G06Q 30/0251* (2023.01)
*G06F 3/0482* (2013.01)
(Continued)

(52) U.S. Cl.
CPC ....... *G06Q 30/0269* (2013.01); *G06F 3/0482* (2013.01); *G06Q 30/0201* (2013.01); *G06Q 30/0217* (2013.01); *G06Q 30/0237* (2013.01)

(58) Field of Classification Search
None
See application file for complete search history.

(56) References Cited

U.S. PATENT DOCUMENTS 9,865,005 B1 * 1/2018 Pottjegort .......... G06Q 30/0242
2005/0216343 A1 9/2005 Tokorotani
(Continued)

FOREIGN PATENT DOCUMENTS

CA 2982605 A1 * 10/2016 ......... G06Q 30/0635
JP 2002-281483 A 9/2002
(Continued)

OTHER PUBLICATIONS

Miriyala, Srinivas, "Smart Coupon Dispenser", Aug. 1, 2001, https://priorart.ip.com/IPCOM/000005045 (Year: 2001).*
(Continued)

*Primary Examiner* — Michael Bekerman
*Assistant Examiner* — Scott Snider
(74) *Attorney, Agent, or Firm* — McDermott Will & Emery LLP (57) ABSTRACT

A method for providing, to a consumer in a mobile device, a digital content to be displayed on the mobile device, is disclosed. The method includes requesting non-personally identifiable information from a consumer in a pixel script of the advertisement payload, tracking an event trigger in the pixel script, the event trigger configured to fire upon completion of a selected portion of the advertising payload, and modifying a consumer account based on the event trigger and the non-personally identifiable information. The method also includes providing an updated feature of the consumer account to a retail store when a configured rule in the pixel script is satisfied. A system including a memory storing instructions to cause the system to execute the above method is also provided.

15 Claims, 9 Drawing Sheets

(51) Int. Cl.
   *G06Q 30/0201* (2023.01)
   *G06Q 30/0207* (2023.01)
   *G06Q 30/0217* (2023.01)

(56) References Cited

U.S. PATENT DOCUMENTS

| | | | |
|---|---|---|---|
| 2008/0027810 A1* | 1/2008 | Lerner | G06Q 30/02 |
| | | | 705/14.39 |
| 2010/0094692 A1* | 4/2010 | Meyerhofer | G07F 17/3248 |
| | | | 705/14.12 |
| 2010/0094709 A1 | 4/2010 | Kuroda | |
| 2010/0198692 A1 | 8/2010 | Hotta et al. | |
| 2010/0306048 A1 | 12/2010 | Corduneanu et al. | |
| 2010/0306808 A1* | 12/2010 | Neumeier | H04N 21/47 |
| | | | 725/105 |
| 2011/0010245 A1 | 1/2011 | Priebatsch et al. | |
| 2011/0035296 A1 | 2/2011 | Messer et al. | |
| 2011/0035395 A1 | 2/2011 | Messer et al. | |
| 2011/0238476 A1* | 9/2011 | Carr | H04W 4/029 |
| | | | 705/14.1 |
| 2013/0346201 A1* | 12/2013 | Bilange | G06Q 30/0256 |
| | | | 705/14.54 |
| 2014/0316892 A1 | 10/2014 | L'Heureux | |
| 2015/0193828 A1* | 7/2015 | Bulger | G06Q 30/02 |
| | | | 705/14.66 |
| 2015/0302456 A1* | 10/2015 | Rego | G06Q 30/0235 |
| | | | 705/14.35 |
| 2015/0379552 A1* | 12/2015 | Kent | G06Q 20/202 |
| | | | 705/14.38 |
| 2016/0092935 A1* | 3/2016 | Bradley | G06Q 30/0276 |
| | | | 705/14.72 |
| 2016/0165278 A1 | 6/2016 | Soma | |
| 2016/0225029 A1* | 8/2016 | VanDeVelde | G06Q 30/0275 |
| 2016/0307229 A1* | 10/2016 | Balasubramanian | |
| | | | G06Q 30/0263 |
| 2017/0026671 A1* | 1/2017 | Neumeier | H04N 21/47 |
| 2019/0043080 A1* | 2/2019 | Buchalter | G06Q 30/0272 |
| 2019/0147471 A1* | 5/2019 | McKelvey, Jr. | H04W 4/021 |
| | | | 705/14.1 |

FOREIGN PATENT DOCUMENTS

| | | | | |
|---|---|---|---|---|
| JP | 2005-284555 | A | 10/2005 | |
| JP | 2006-031724 | A | 2/2006 | |
| JP | 2008-003982 | A | 1/2008 | |
| JP | 2008-204261 | A | 9/2008 | |
| JP | 2009-075907 | A | 4/2009 | |
| JP | 2009-086154 | A | 4/2009 | |
| JP | 2011-034304 | A | 2/2011 | |
| JP | 2014-130458 | A | 7/2014 | |
| JP | 2015-176322 | A | 10/2015 | |
| JP | 2015-187838 | A | 10/2015 | |
| JP | 2016-102968 | A | 6/2016 | |
| WO | WO-2004090760 | A1 * | 10/2004 | G06F 3/014 |
| WO | 2008/107968 | A1 | 9/2008 | |
| WO | 2014177167 | A1 | 11/2014 | |
| WO | 2015/012000 | A1 | 1/2015 | |

OTHER PUBLICATIONS

Carrascal, Juan Pablo, et al. 'Your Browsing Behavior for a Big Mac: Economics of Personal Information Online'. CoRR, vol. abs/1112.6098, 2011, http://arxiv.org/abs/1112.6098. (Year: 2011).*
Notification of Transmittal of the International Search Report and The Written Opinion of the International Searching Authority, or the Declaration for PCT/US2019/035221 dated Oct. 1, 2019, 15 pages.
International Preliminary Report on Patentability issued in PCT/US2019/035221 dated Dec. 17, 2020.
Office Action issued in corresponding JP Application No. 2020-567551, dated May 19, 2022 (5 pages).
Office Action issued in corresponding JP Application No. 2020-567551, dated Dec. 15, 2022 (10 pages).

* cited by examiner

PARAMETRIC TRACKING AND TRIGGERING OF ADVERTISING EVENTS IN ONLINE MULTIMEDIA ENVIRONMENTS

CROSS-REFERENCE TO RELATED APPLICATIONS

The present disclosure is related, and claims priority under 35 U.S.C. § 119(e), to U.S. Provisional Patent Application No. 62/680,505, entitled "PARAMETRIC TRACKING AND TRIGGERING OF ADVERTISING EVENTS IN ONLINE MULTIMEDIA ENVIRONMENTS," to Zubin Singh et al., filed on Jun. 4, 2018, the contents of which are herein incorporated by reference in their entirety, for all purposes.

BACKGROUND

Field

The present disclosure generally relates to parametric tracking and triggering of advertising events in multimedia environments. More specifically, the present disclosure is related to the triggering of an action related to a consumer account based on advertising events when the consumer is accessing a mobile application via a networking device.

Description of the Related Art

Retail vendors aggressively compete for market share among a customer sector that becomes more and more sophisticated with the advent of mobile computing devices and social network environments. To efficiently and reliably attract a customer base, retail vendors in brick-and-mortar stores are confronted with the task of competing with network-based, remote retail services. However, many of the marketing tools available today for retail vendors require a consumer to log in to a retail supplier web page in order to actively search for an offer or activate a coupon.

SUMMARY

In a first embodiment, a computer-implemented method is disclosed that includes providing, to a consumer in a mobile device, a digital content to be displayed on the mobile device. The computer-implemented method further includes requesting non-personally identifiable information from a consumer in a pixel script of the advertisement payload, tracking an event trigger in the pixel script, the event trigger configured to fire upon completion of a selected portion of the advertising payload, and modifying a consumer account based on the event trigger and the non-personally identifiable information. The computer-implemented method also includes providing an updated feature of the consumer account to a retail store when a configured rule in the pixel script is satisfied.

In another embodiment, a computer-implemented method is provided that includes receiving, in an in-store media platform or server, an updated feature or profile of a consumer account resulting from an event trigger in a pixel script. The pixel script may be embedded in a digital content displayed on a mobile or desktop device for the consumer through a network application, a browser, a sensor application or a tag application, that triggers the pixel script. The computer-implemented method also includes allowing the consumer to receive a value-added certificate, advertising, coupons, discounts, and incentives, based on the event action associated with the initial pixel event trigger.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

General Overview

Many programmatic advertising platforms, such as demand side platforms (DSPs), currently offer advertisers the ability to upload static and dynamic advertisement payloads such as banner and video content that can be provided by brand advertisers associated with consumer-packaged goods (CPGs). When a consumer receiving content provided by a DSP to a supply-side platform (SSP) interacts with the advertisement payload on their networked multimedia appliance, retail and brand advertisers may miss many of the nuances and nature of the interaction associated to the consumer. This leads to a loss of opportunity for the retail and brand advertiser to capture or attract the consumer to further actions, like attracting the customer to a brick-and-mortar store for the purposes of driving a purchase based conversion, or a tactic such as repeat purchase, or to simply offer up a value-added certificate, advertising, coupons, discounts, and incentives based conversions as a result of viewing a digital advertisement.

The disclosed system addresses this problem specifically arising in the realm of computer technology by providing a solution also rooted in computer technology, namely, by allowing a pixel script that is embedded as a part of the digital advertisement payload to perform a parametric tracking of advertising events in multimedia environments according to configuration rules that are designed to provide coupons, discount offers, and other perks to users, regardless of the time and place of the interaction with the advertisement payload.

The subject system provides several advantages, including the ability to configure different rules to apply during an advertising event and entice a remote consumer with a value-added certificate, advertising, coupons, discounts, and incentives that may prompt the consumer to visit, return, or stay at a retail store. In some embodiments, the advertisement payload may be part of a campaign generated by a brand manufacturer or a retail advertiser that carries one or more CPGs. The campaign may be generated periodically (e.g., once a week) in the interest of attracting customers and/or rewarding loyal customers having a frequent shopper identification (FSC ID). The system provides an advertisement payload including offers, promotions, and coupons to a user's digital device (desktop, phone, table), based on an FSC ID associated with the retail supplier.

Although many examples provided herein describe a user's advertising-related activity to be identifiable, each consumer may grant explicit permission for such consumer information to be shared or stored. The explicit permission may be granted using privacy controls integrated into the disclosed system. Each consumer may be provided notice that such consumer information will be shared with explicit consent, and each consumer may at any time terminate the information sharing, and may delete any stored consumer information. The stored consumer information may be encrypted to protect consumer security.

Figure 1:
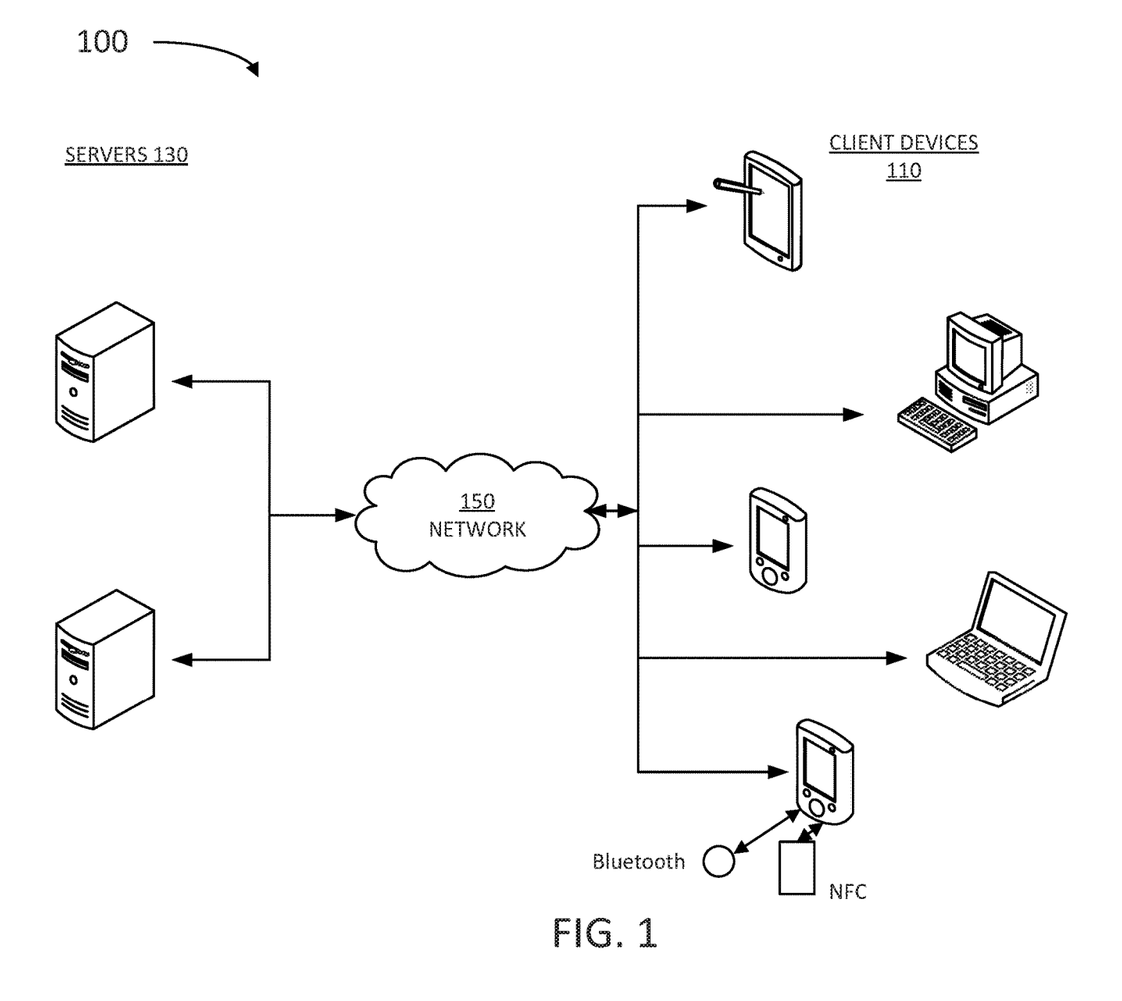
FIG. 1 illustrates an example architecture suitable for practicing some implementations of the disclosure.

FIG. 1 illustrates an example architecture 100 suitable for practicing some implementations of the disclosure. Architecture 100 includes servers 130 and client devices 110 connected over a network 150. One of the many servers 130 and client devices 110 may include a memory storing instructions which, when executed by a processor, cause the server 130 and the client device 110 to perform at least some of the steps in methods as disclosed herein. In some embodiments, architecture 100 is configured to track an advertisement payload being played by a consumer via client device 110. Upon reaching a trigger event, one or more of servers 130 may instruct a client device (e.g., a printer) to print a coupon for the consumer based on the advertisement payload. The targeted advertisement payload, including trigger criteria, may be prepared by a user of one of servers 130, based on an advertisement campaign to promote a CPG, or a retailer chain or branch.

Servers 130 may include any device having an appropriate processor, memory, and communications capability for hosting the history log, an advertisement database, and an advertisement server. The advertisement server may be accessible by various client devices 110 over the network 150. In some embodiments, servers 130 may include a dynamic rendering server, a publisher, or SSP server, and a DSP server. Client devices 110 may include, for example, desktop computers, mobile computers, tablet computers (e.g., including e-book readers), mobile devices (e.g., a smartphone or PDA), or any other devices having appropriate processor, memory, and communications capabilities for accessing one or more of servers 130 through network 150. In some embodiments, client devices 110 may include a Bluetooth radio or a near-field-communication (NFC) transmitter device and application, enabling the client device to communicate directly with another device in its proximity, e.g., a device at a point-of-sale (POS) in a retail store). Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
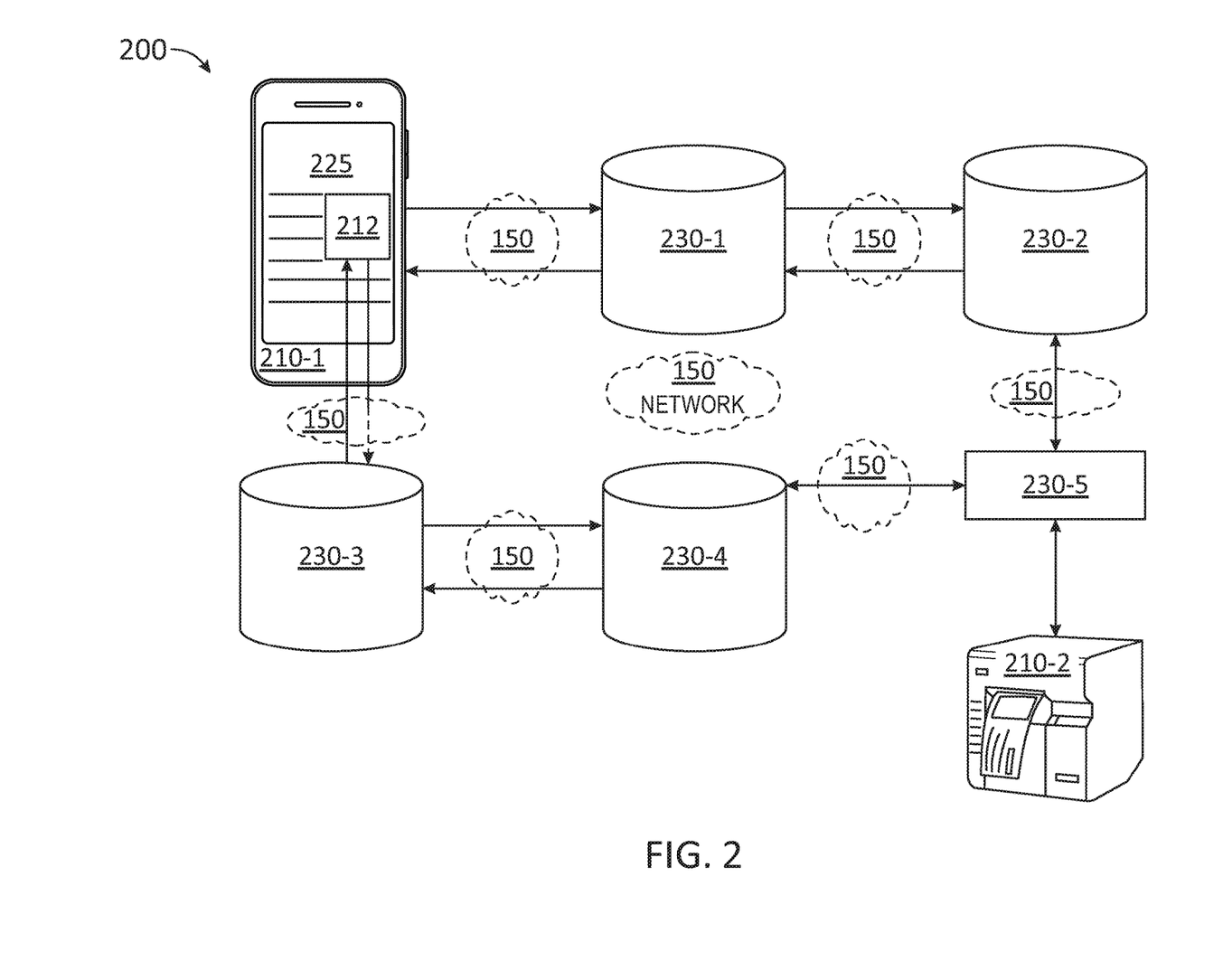
FIG. 2 illustrates a system including a mobile device running a browser or mobile application and communicatively coupled with multiple servers, according to some embodiments.

FIG. 2 illustrates a system 200 with a mobile device 210-1 including a browser or mobile application 225 and communicatively coupled with multiple servers, according to some embodiments. The servers may include a supply-side publishing (SSP) server 230-1, an advertising technology server 230-2, a dynamic rendering server 230-3, a digital promotion server 230-4, and a retail server platform 230-5. Servers 230-1 through 230-5 will be collectively referred to, hereinafter, as "servers 230." In some embodiments, one or more of servers 230 may include or have access to a database including a lookup table pairing a mobile device identifier (e.g., a mobile cookie ID) with a retail-specific frequent shopper identification (FSC ID) card of the consumer using the mobile device, such as illustrated in TABLE I, below. The FSC ID card may identify an account of the consumer having mobile device 210-1 with retail server platform 230-5. Servers 230 communicate with each other, with mobile device 210-1, and with retail server platform 230-5 via network 150.

TABLE I

| Mobile Cookie ID | Retail Supplier's FSC ID |
|---|---|
| hsh192zur94 | 384759 |
| su928470184 | 495038 |

The information in Table I is safe, and NOT personally identifiable information (PII), in that no direct personal information from a consumer is involved (e.g., address, phone no., social security no., and the like).

In some embodiments, retail server platform 230-5 services multiple retail stores (e.g., from multiple retail chains), and controls at least one printer 210-2 at a specific store location. Mobile device 210-1 and printer 210-2 will be collectively referred to, hereinafter, as "devices 210." Each of servers 230, and devices 210, may include a memory and a processor, wherein the memory may store instructions which, when executed by the processors, cause servers 230 and devices 210 to perform, at least partially, some of the steps as disclosed herein. Mobile device 210-1 downloads and plays, with browser or application 225, multimedia content provided by SSP server 230-1. SSP server 230-1 may request advertisement bids from and is registered with advertising technology server 230-2. The multimedia content may include a TV application, a music file, a video file, a news feed, a game, and the like. The multimedia content may include a dynamic online call for an advertisement payload from dynamic rendering server 230-3. In some embodiments the advertisement payload includes a video or a banner based file, and a pixel script including instructions.

In some embodiments, dynamic rendering server 230-3 may install and host advertisement unit 212 in browser 225. Advertisement unit 212 may be configured to execute, at least partially, the pixel script embedded in the multimedia downstream from SSP server 230-1. Upon execution of the pixel script by advertisement unit 212, dynamic rendering server 230-3 may retrieve, from digital promotion server 230-4, a coupon or any other value-added certificate for the consumer with mobile device 210-1.

Advertising technology server 230-2 may be communicatively coupled with digital promotion server 230-4 and may be configured to execute logic commands that use the identifier of mobile, desktop, and connected TV devices to cross-walk an ID mapping table (e.g., TABLE I, above) to look up the corresponding retail supplier's FSC ID (frequent shopper card ID). Accordingly, when the consumer, using mobile device 210-1, is viewing an advertisement embedded in a multimedia environment provided by SSP server 230-1, the pixel script may be activated at a pre-selected point in the advertisement file. Upon execution of the pixel script by advertisement unit 212, digital promotion server 230-4 is prompted to retrieve non-personally identifiable information from the consumer, using the mobile cookie ID (e.g., the FSC ID, cf. Table I). Retail server platform 230-5 then instructs printer 210-2 to print the coupon or value-added certificate when it detects that the consumer is present at a retail store. For example, retail server platform 230-5 may instruct printer 210-2 at a point of sale (POS) where the consumer is located, to print a coupon for a CPG.

Figure 3A:
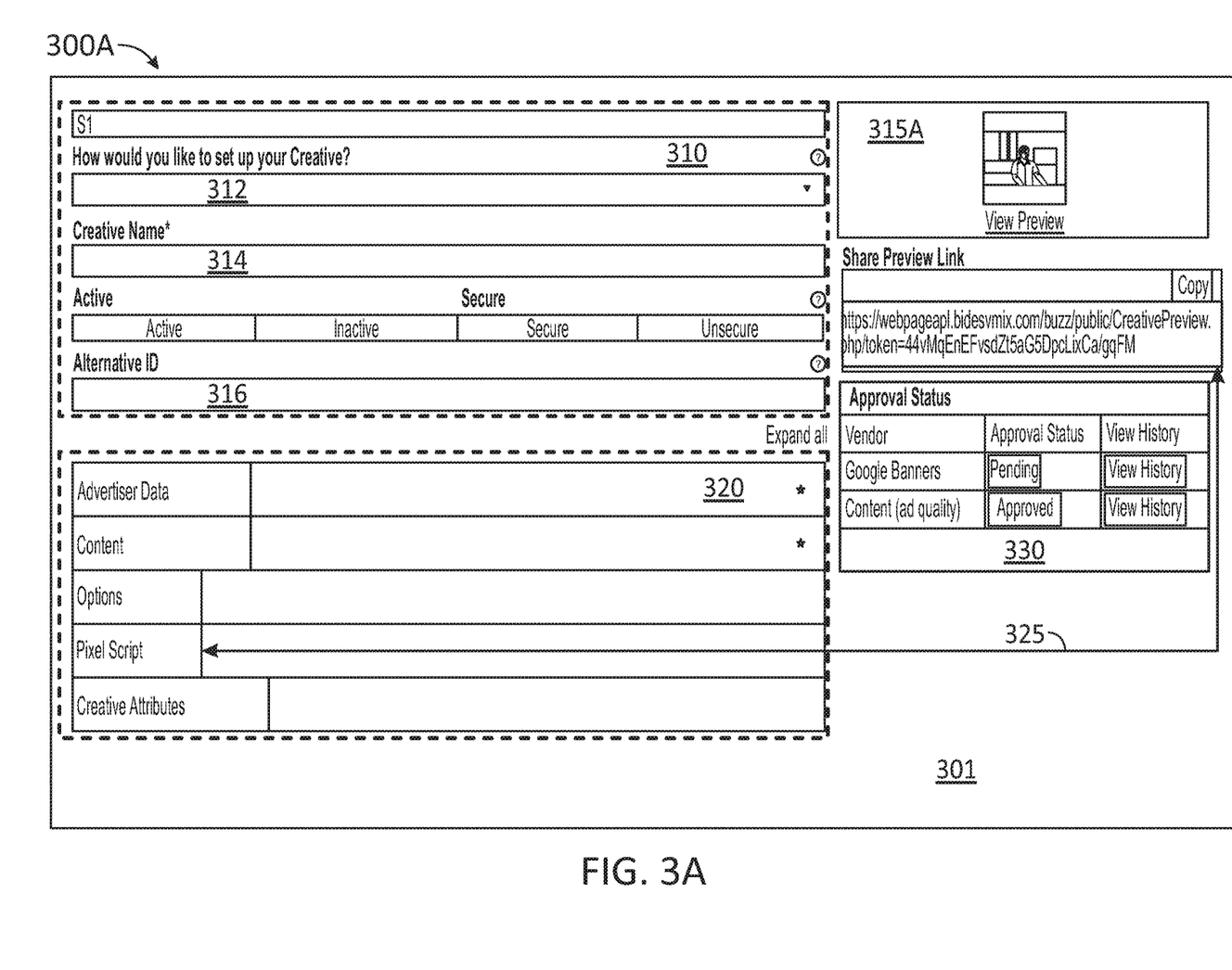
FIGS. 3A-C illustrate screen shots of an application in a dynamic rendering server for creating an advertisement payload including a pixel script to trigger a value-added offer, according to some embodiments.
Figure 3B:
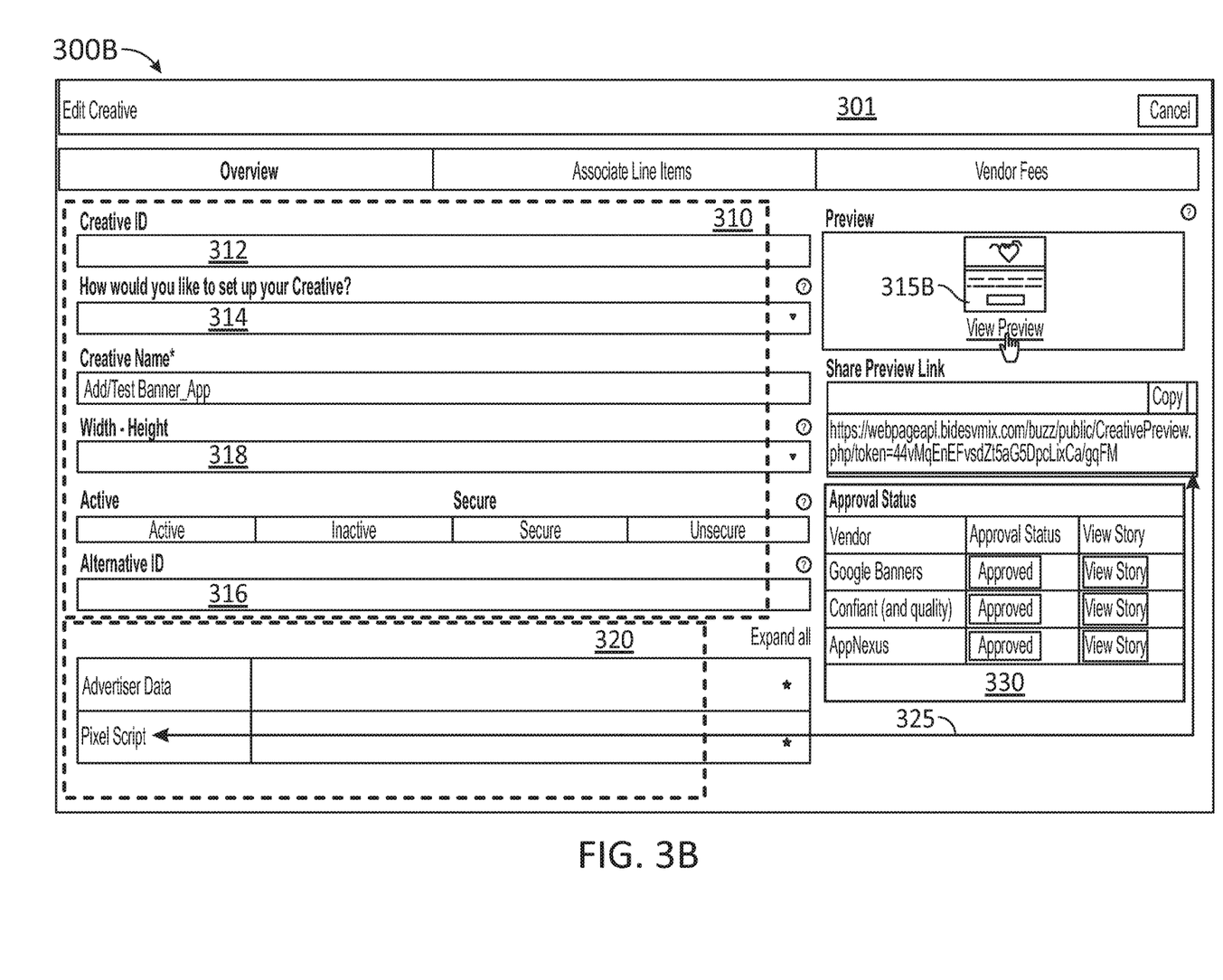
Figure 3C:
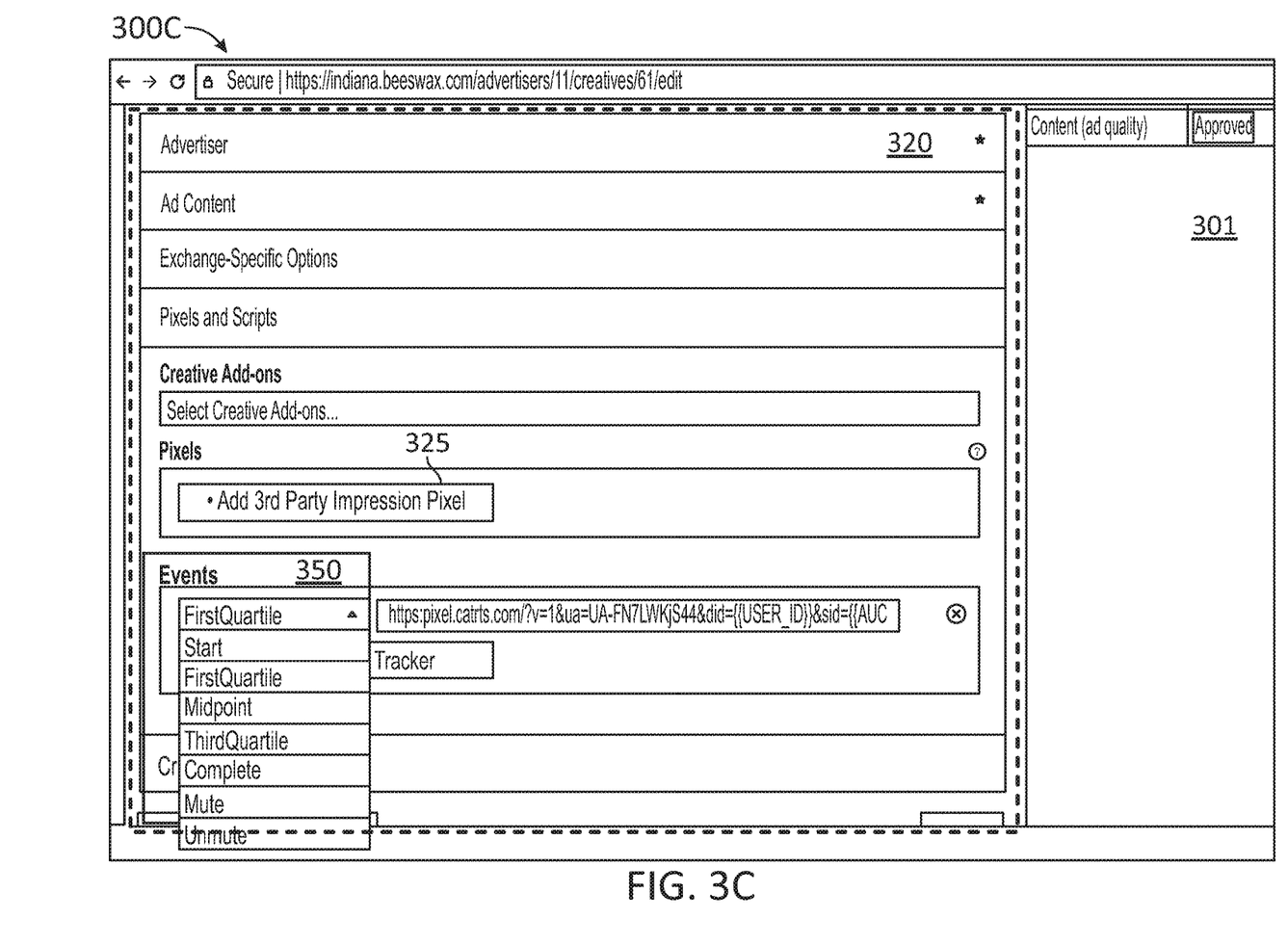

FIGS. 3A-C illustrate screen shots 300A, 300B, and 300C respectively (hereinafter, collectively referred to as "screen shots 300") of an application 301 for creating an advertisement payload including a pixel script 325 to trigger a value-added offer, according to some embodiments. In some embodiments, application 301 may be installed in any host server associated with an advertising firm, the CPG, a retailer store, or multiple controlling servers (e.g., any one of servers 230, including dynamic rendering server 230-3, digital promotion server 230-4, advertising technology server 230-2, or retail server platform 230-5, cf. FIG. 2).

A field 310 may include entries for the setup selection. Entries in field 310 may include a selection 312 of the type of media content that is desired (e.g., banner or video advertisement, audio advertisement, and the like). A field 314 includes the name of the advertisement file. A field 316 includes an alternative identification string. Other options in field 310 may include an "Active" tab, to activate the ad, and a "Secure" tab, to apply security protocols to the media stream, as desired. Application 301 enables the inclusion of creative attributes in the advertisement, as specified in a field 320. Some of the creative attributes in field 320 include advertiser data (e.g., name and ID), content (e.g., a path for a file that includes the advertisement content—video, banner, gif, and the like), options, and a pixel script 325, in an attribute field 320. A field 330 (cf. FIGS. 3A-B) indicates the approval status for the advertisement. The approval status may indicate whether an SSP server will carry the advertisement, or when certain conditions are satisfied or not (e.g., quality, size, appropriateness for selected audiences, and the like).

Pixel script 325 includes multiple instructions, at least some of which are executed by the mobile application playing the advertisement for the consumer (e.g., mobile application 225 or advertisement unit 212 in mobile device 210-1). Pixel script 325 is configured to be executed upon the occurrence of a selected event during the advertisement streaming by the mobile application. Upon execution, pixel script 325 provides one or more of the controlling servers with information to give the consumer a coupon or added-value certificate associated with the CPG in the advertisement. Moreover, a server for a retail store that stocks the CPG may be informed of the consumer presence at one of the retail stores (e.g., retail server platform 230-5, via a location identification of the mobile device). The server for the retail store then instructs a printer in the retail store (e.g., at a POS) to print the coupon or added-value certificate for the consumer.

For exemplary purposes only, and without limitation as to the specific compiler language used, pixel script 325 may include the following commands:

```
"https://pixel.catrts.com/?v=1&ua=UA-
FN7lWKJS4&did={{USER_ID}}&sid={{Auction_ID}}&uip=&cm=ad&t=impr
ession&dr={{REFERRER}}&idl={{DOMAIN}}&dh={{HOST}}T&ci={{CAM
PAIGN_ID}}&sys={{APP_ID}}&pub={{INVENTORY_SOURCE}}&ste={{SI
TE_NAME}}&advertisements={{CREATIVE_ID}}&lat={{LAT}}&lon={{LO
NG}}&aid={{APP_ID}}&av={{APP_BUNDLE}}&cn=Labs_sequential_market
ing_test_april_instore&cs=web&ea=play&el=mobile_web&ev=test_group"
```

Wherein the USER ID command requests a digital ID for the mobile device used by the consumer (e.g., an ID for a mobile phone, or the mobile application running the advertisement). The Auction ID command may generate a random number identifying the pixel execution. The REFERRER command requests the universal resource locator (URL) of the website showing the advertisement. The DOMAIN command requests the domain of the publishing server providing the advertisement (e.g., SSP server 230-1). The HOST command requests the IP address of the publishing server. The CAMPAIGN ID command requests the digital campaign ID for a given CPG. The APP ID command requests the ID of the mobile application used in the mobile device to display the advertisement to the consumer, and this entry may be reused further along in the script. The INVENTORY SOURCE command requests the identity of a server acting as a platform for the publishing server (e.g., the network server hosting the publishing server). The SITE NAME command requests the site in which the advertisement will be shown (e.g., a URL, and the like). The CREATIVE ID command requests the identification of the video content. The LAT and LONG commands retrieve, respectively, latitude and longitude coordinates in a GPS locator where the advertisement is being used (not populated from a desktop browser). The APP_BUNDLE command requests a bundle identifier according to the operating system running the mobile application. The values and parameters requested in the above command from the pixel script are dynamically populated by one or more of the controller servers, as the advertisement is being played by the consumer.

FIG. 3A illustrates screen shot 300A with a first partial view of application 301 in the creative rendering server, according to some embodiments. A user may access application 301 to edit an advertisement video 315A.

FIG. 3B illustrates a template of a screen display with a second partial view of a computer-implemented method as disclosed herein. The content in advertiser data includes a banner advertisement 315B, with dimensions provided by field 318 (Width×Height).

FIG. 3C illustrates a template of a screen shot 300C including field 320 and pixel 325. Display 300C also illustrates an "Events" feature 350, wherein the user may select the type of event that triggers execution of pixel script 325 when the advertisement is being displayed in the mobile application (e.g., mobile application 225). When the advertisement is a video clip, the event selected in event feature 350 may include a fractional completion of the video clip, such as a 0% ("Start"), a 25% ("First Quartile"), a 50% ("Midpoint"), a 75% ("Third Quartile"), or a 100% ("Complete") of the stream of the advertising payload. In embodiments including a banner advertisement (e.g., banner advertisement 315B), the event trigger may include the start of the display. In yet other embodiments, the trigger selected in events feature 350 may include a mute/unmute action by the consumer, or a click within the area of the video or a highlighted portion of the advertisement.

Figure 4:
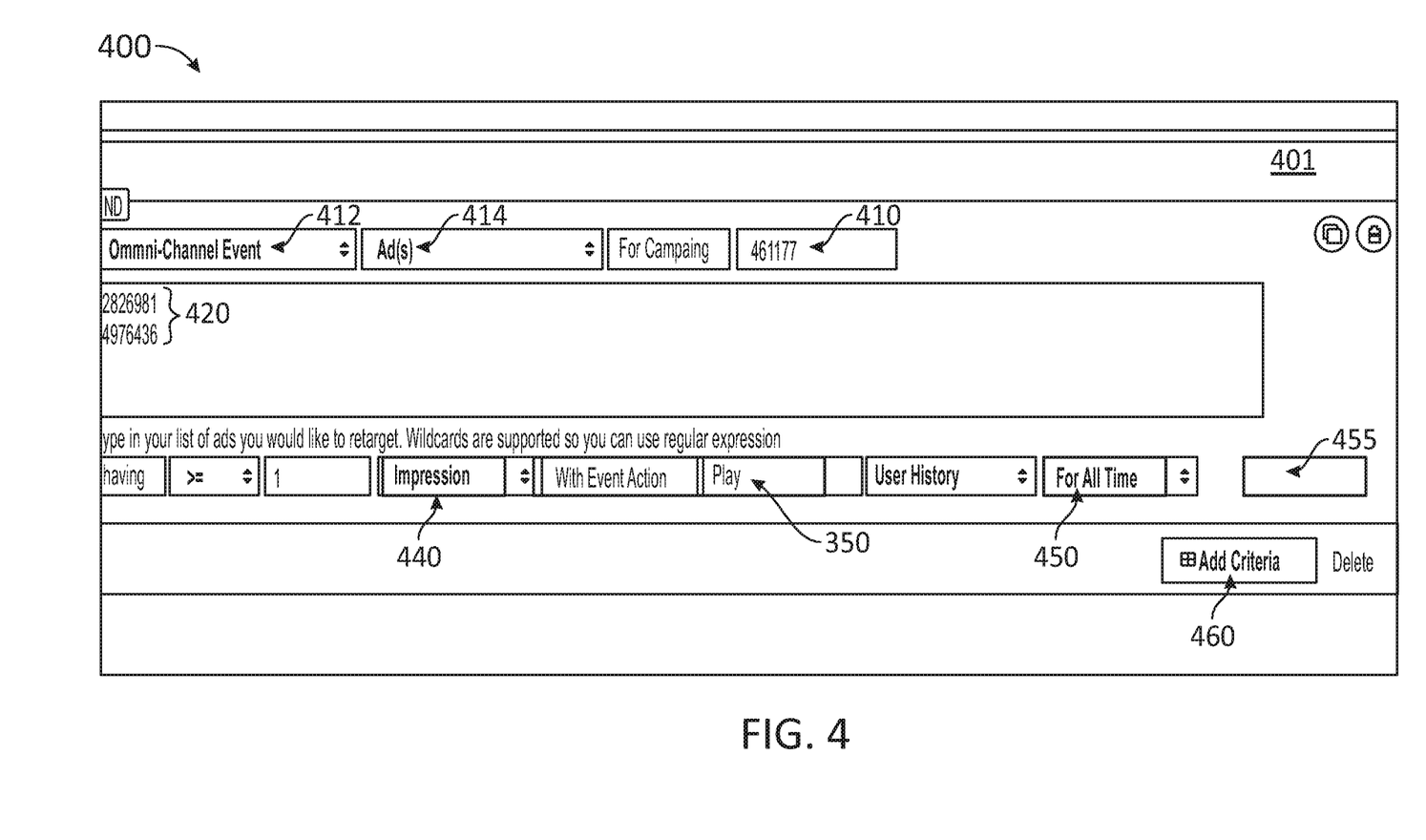
FIG. 4 illustrates a screen shot of an application in a retail server platform for handling a pixel script triggered by an advertisement payload, according to some embodiments.

FIG. 4 illustrates a template of a screen display 400 in application 401 in a retail server platform for handling a pixel script triggered by an advertisement payload (e.g., retail server platform 230-5 and pixel script 325), according to some embodiments. Application 401 may include a queue 420 of campaign identifiers. The retail server platform may be placed at a centralized location and service multiple retail stores at different locations. Field 412 may select which of the retail store locations are being serviced, and field 414 may select the type of payload that is being processed for a campaign identified in field 410.

Each campaign identifier (selected by field 410) may be associated to a coupon or value-added certificate that a consumer has earned through a trigger of a pixel script in an advertisement payload (e.g., pixel script 325). For a coupon associated with campaign ID 410, application 401 may receive an instruction 440 ("impression") to print a coupon or a value-added certificate from a digital promotion server, or an advertisement technology server (e.g., digital promotion server 230-4 and advertisement technology server 230-2, via printer 210-2 at a POS in a retail store). Instruction 440 may be executable provided that a number of parameter values are "true." Some of the parameter values are determined according to the advertising campaign parameters, the consumer location, and the retail store location. Some of the parameters that prompt instruction 440 may include verification of a trigger event in a pixel script (e.g., trigger event 350 in pixel script 325), verification of a time window 450 based on the start date and the end date of an advertisement campaign for the advertisement payload, verification of the presence of the consumer in the retail store, and a geographic region (e.g., zip code, country, state, or time zone) 455 of the retail store. In some embodiments, display 400 may also include a tab 460 to add new criteria or parameter values for executing instruction 440.

Figure 5:
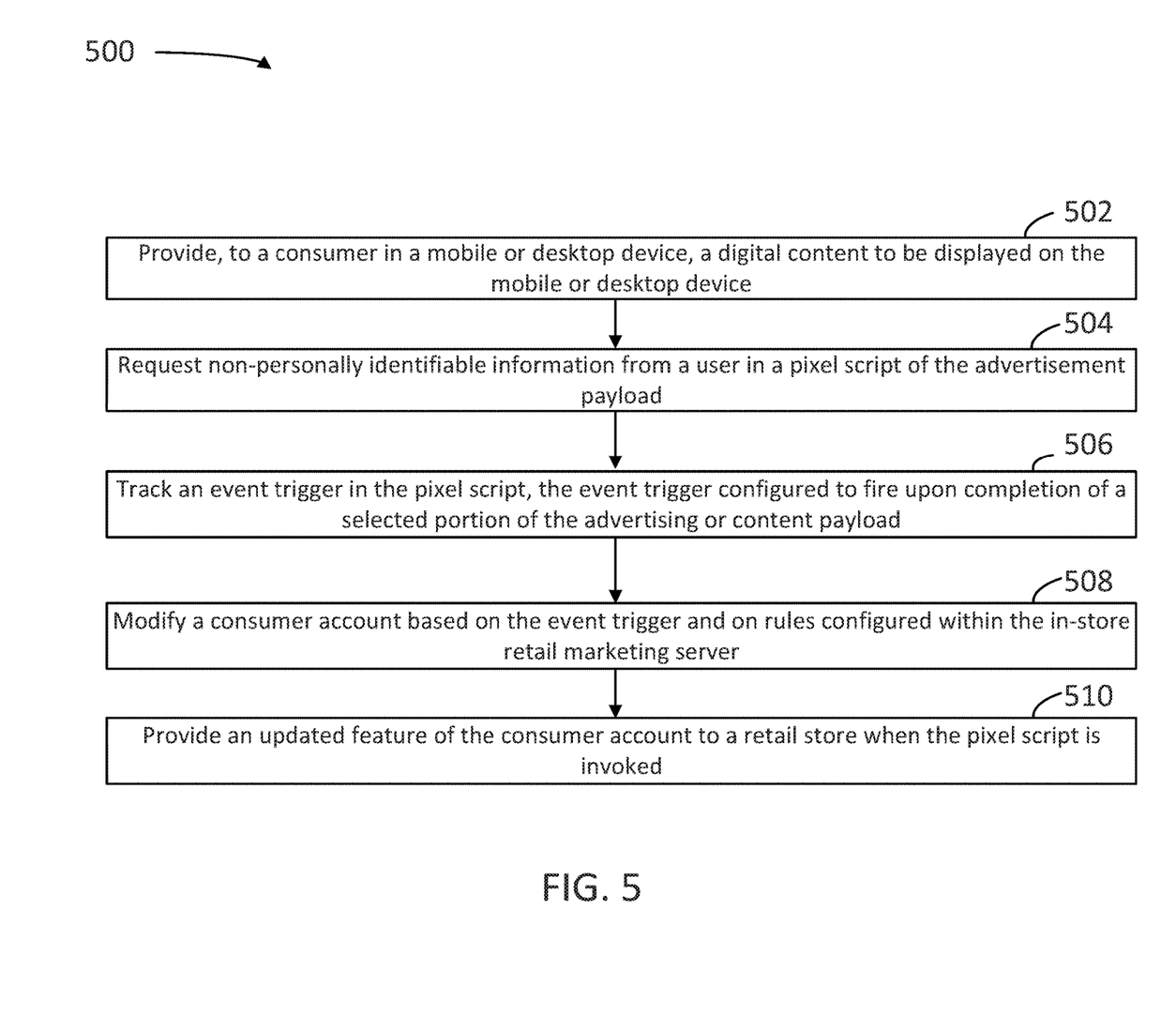
FIG. 5 is a flowchart illustrating steps in a method for triggering and tracking advertisement events in a payload stream from a server, according to some embodiment.

FIG. 5 illustrates steps in a method 500 for triggering and tracking advertisement events in a payload stream from a server (e.g., any one of servers 230), according to some embodiments. Method 500 may be performed at least partially by any one of the plurality of servers illustrated in FIGS. 1 and 2. For example, at least some of the steps in method 500 may be performed by one component in a system, including a mobile device running code for a browser or a mobile application to access a multimedia file from an SSP server (e.g., client devices 110, mobile device 210-1, mobile application 225, advertisement unit 212, and SSP server 230-1). Further, in some embodiments, some of the steps in method 500 may be performed at least partially by an advertisement technology server coupled with a digital promotion server and a dynamic rendering server, and with a retail server platform (e.g., advertising technology server 230-2, the dynamic rendering server 230-3, digital promotion server 230-4, and retail server platform 230-5). Accordingly, at least some of the steps in method 500 may be performed by a processor executing commands stored in a memory of the server or the mobile device, or accessible by the server or the mobile device. Further, in some embodiments, at least some of the steps in method 500 may be performed overlapping in time, almost simultaneously, or in a different order from the order illustrated in method 500. Moreover, a method consistent with some embodiments disclosed herein may include at least one, but not all, of the steps in method 500.

Step 502 includes providing, to a consumer in a mobile or desktop device, a digital content to be displayed on the mobile or desktop device. In some embodiments, step 502 includes providing the digital content through an application or browser running in the mobile or desktop device. In some embodiments, step 502 includes providing the digital content through Bluetooth beacons or an NFC tag through a Bluetooth radio or an NFC receiver in the mobile or desktop device that is invoked by a mobile application. In some embodiments, the digital content may include an advertisement payload from a multimedia file including one of a video, a banner, a .gif file, a .png file, or an audio advertisement. In some embodiments, step 502 includes uploading the advertisement payload on a supply side platform server.

Step 504 includes requesting non-personally identifiable information from a user in a pixel script of the advertisement payload. In some embodiments, step 504 includes providing an expiration time for the updated feature according to an advertisement campaign associated with the advertisement payload in the pixel script. In some embodiments, step 504 includes selecting the CPG in the advertisement payload based on the non-personally identifiable information.

Step 506 includes tracking an event trigger in the pixel script, the event trigger configured to fire upon completion of a selected portion of the advertising or content payload.

Step 508 includes modifying a consumer account based on the event trigger and on rules configured within the in-store retail marketing server. In some embodiments, step 508 includes providing the event trigger and the non-personally identifiable information to the digital promotion server. In some embodiments, the pixel script includes a campaign identification parameter, an event action parameter, an impression parameter, and an advertisement parameter, and step 508 includes verifying that at least one of the campaign identification parameter, the event action parameter, the impression parameter, and the advertisement parameter is true.

Step 510 includes providing an updated feature of the consumer account to a retail store when the pixel script is invoked. In some embodiments, step 510 includes requesting a campaign identification for an advertisement campaign associated with the advertisement payload, in the pixel script. In some embodiments, the updated feature includes at least one of a digital promotion, an offer, and a coupon associated with the CPG and the retail store, and step 510 includes providing a promotion identifier and a campaign identifier together with the updated feature. In some embodiments, the selected portion may include a 0%, 25%, a 50%, a 75%, or a 100% of the advertising payload, and step 510 includes updating a feature according to the selected portion. In some embodiments, step 510 includes requesting the retail store to print a coupon for the consumer based on the updated feature, when the consumer is in the retail store. In some embodiments, step 510 includes requesting a campaign identification for an advertisement campaign associated with the advertisement payload, in the pixel script.

Figure 6:
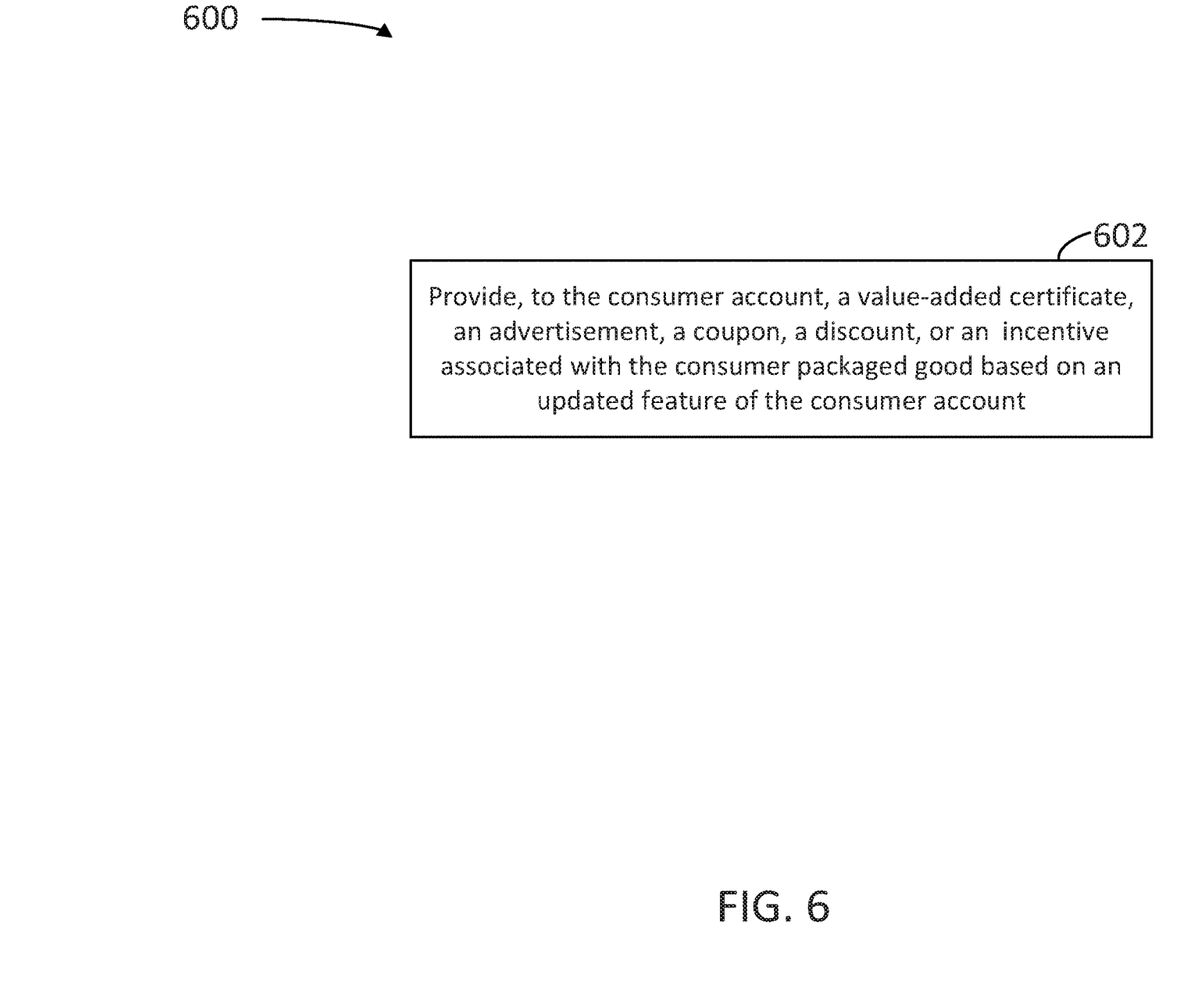
FIG. 6 is a flowchart illustrating steps in a method for rendering and displaying advertisements in a desktop environment or mobile device from an advertising and marketing technology system coupled with the digital promotion server, according to some embodiments.

FIG. 6 illustrates steps in a method 600 for triggering and tracking advertisement events in a payload stream from a server (e.g., any one of servers 230), according to some embodiments. Method 600 may be performed at least partially by any one of the plurality of servers illustrated in FIGS. 1 and 2. For example, at least some of the steps in method 600 may be performed by one component in a system, including a mobile device running code for a browser or a mobile application, to access a multimedia file from an SSP server (e.g., client devices 110, mobile device 210-1, mobile application 225, advertisement unit 212, and SSP server 230-1). Further, in some embodiments, some of the steps in method 600 may be performed at least partially by an advertisement technology server coupled with a digital promotion server and a dynamic rendering server, and with a retail server platform (e.g., advertising technology server 230-2, the dynamic rendering server 230-3, digital promotion server 230-4, and retail server platform 230-5). Accordingly, at least some of the steps in method 600 may be performed by a processor executing commands stored in a memory of the one or more servers, or accessible by the server. Further, in some embodiments, at least some of the steps in method 600 may be performed overlapping in time, almost simultaneously, or in a different order than the order illustrated in method 600. Moreover, a method consistent with some embodiments disclosed herein may include at least one, but not all, of the steps in method 600.

Step 602 includes providing, to the consumer account, a value-added certificate, an advertisement, a coupon, a discount, or an incentive associated with the CPG based on an updated feature of the consumer account. In some embodiments, step 602 includes printing, in a printer communicatively coupled to the in-store media platform, a coupon for the consumer account. In some embodiments, step 602 includes updating the consumer account when the consumer redeems the value-added certificate, digital promotion, or the coupon associated with the CPG. In some embodiments, step 602 includes notifying an advertisement technology server 230-2 when the consumer redeems the value-added certificate, the digital promotion, or the coupon associated with the CPG. In some embodiments, step 602 may further include providing a new advertisement payload personalized to the consumer, based on the printing and redeeming of the value-added certificate, digital promotion, or coupon. The new advertisement payload may be associated to a CPG related to the CPG of the original advertisement payload, or to a product available at the same retailer store where the original CPG was located (and/or purchased by the consumer).

In some embodiments, step 602 includes receiving, in an in-store retail marketing server, an updated feature of a consumer account, the updated feature associated with a CPG for sale in a store location of the in-store media platform. In some embodiments, step 602 includes identifying a consumer presence in the store location based on a device identification detected from a consumer device and a retailer associated frequent shopper card. In some embodiments, step 602 includes receiving a request for accessing a consumer's frequent shopper loyalty account from the consumer device at a point of sale in the store location.

Hardware Overview

Figure 7:
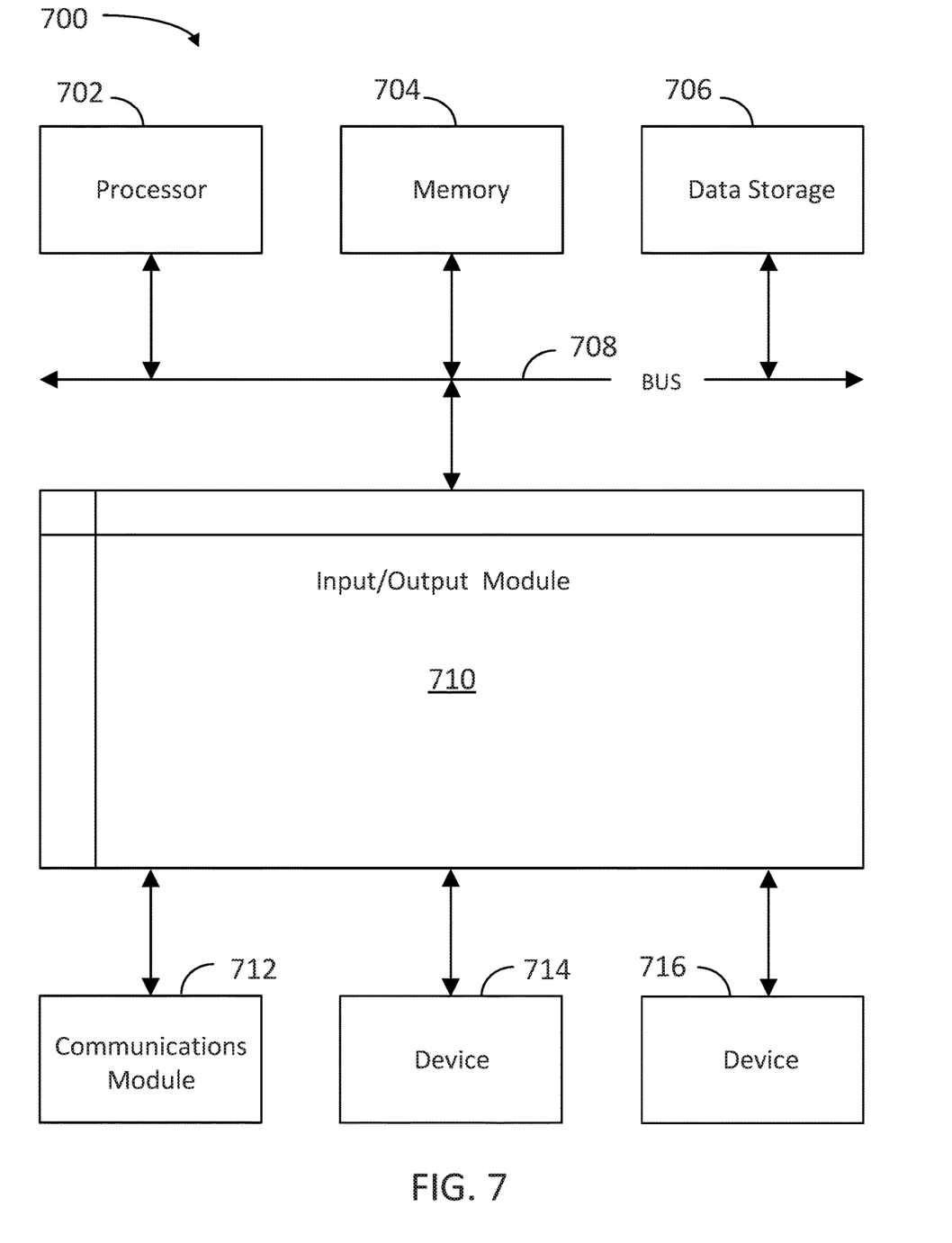
FIG. 7 is a block diagram illustrating an example computer system with which the client and network device of FIG. 1 and the methods of FIGS. 5-6 can be implemented.

FIG. 7 is a block diagram illustrating an example computer system 700 with which the client and network device of FIG. 1 and the methods of FIGS. 5-6 can be implemented. In certain aspects, computer system 700 may be implemented using hardware or a combination of software and hardware, either in a dedicated network device, or integrated into another entity, or distributed across multiple entities.

Computer system 700 (e.g., client devices 110 and 210-1, and servers 130 and 230) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program consumer products (e.g., one or more modules of computer program instructions encoded on a computer-readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, input/output module 710 is configured to connect to a plurality of devices, such as an input device 714 and/or an output device 716. Exemplary input devices 714 include a keyboard and a pointing device, e.g., a mouse or a trackball, by which a consumer can provide input to the computer system 700. Other kinds of input devices 714 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 716 include display devices, such as an LCD (liquid crystal display) monitor, for displaying information to the user.

According to one aspect of the present disclosure, the client device 110 and servers 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data network device, or that includes a middleware component, e.g., an application network device, or that includes a front-end component, e.g., a client computer having a graphical consumer interface or a Web browser through which a consumer can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and network devices. A client and network device are generally remote from each other and typically interact through a communication network. The relationship of client and network device arises by virtue of computer programs running on the respective computers and having a client-network device relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires forming bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results.

The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
providing, from a host server to a user of a creative rendering application preparing a digital content for a consumer, an option menu for an event trigger, the option menu comprising:
a completion, from a start of the digital content, of a portion larger than a selected fractional portion of the digital content, a start of a banner content,
a consumer action on a consumer mobile device, including at least one of a play action, a pause action, a mute action, an unmute action, and
a click on a highlighted portion of the digital content;
receiving in the host server, from the user of the creative rendering application, a selection of the event trigger from the option menu;
configuring the event trigger in a pixel script based on the selection of the event trigger from the option menu;
providing, to the consumer in a consumer mobile device, the digital content to be displayed on the consumer mobile device, the digital content associated with a consumer packaged good;
verifying that the event trigger is activated by the pixel script in the consumer mobile device when the digital content is displayed on the consumer mobile device;
requesting, upon verification that the event trigger is activated by the pixel script in the consumer mobile device, a non-personally identifiable information from the consumer in the pixel script of the digital content;

modifying a consumer account based on the non-personally identifiable information and on the event trigger activated by the pixel script in the consumer mobile device;

identifying at least one retail store that includes the consumer packaged good when a location of the consumer indicates that the consumer is within the at least one retail store and when the event trigger is activated by the pixel script in the consumer mobile device;

providing an updated feature of the consumer account to the retail store when a configured rule in the pixel script is satisfied; and in response to the consumer being within the at least one retail store and to the event trigger being fired in the consumer mobile device, requesting a client device to print a personalized coupon for the consumer based on the updated feature of the consumer account.

2. The computer-implemented method of claim 1, wherein the digital content is an advertisement payload, further comprising providing a coupon, a discount, a banner, a .gif file, a .png file, a video advertisement or an audio advertisement in the advertisement payload.

3. The computer-implemented method of claim 1, wherein providing an advertisement payload comprises uploading the advertisement payload on a supply side platform server.

4. The computer-implemented method of claim 1, further comprising providing an expiration time for the updated feature according to an advertisement campaign associated with the digital content, in the pixel script.

5. The computer-implemented method of claim 1, further comprising selecting the consumer packaged good in the digital content based on the non-personally identifiable information.

6. The computer-implemented method of claim 1, wherein modifying a consumer account comprises providing the event trigger and the non-personally identifiable information to a digital coupon and promotion technology engine.

7. The computer-implemented method of claim 1, wherein the pixel script includes a campaign identification parameter, an event action parameter, an impression parameter, and an ads parameter, and wherein modifying the consumer account comprises verifying that at least one of the campaign identification parameter, the event action parameter, the impression parameter, and the ads parameter is true.

8. The computer-implemented method of claim 1, wherein the updated feature includes at least one of a digital promotion, an offer, and a coupon associated with the consumer packaged good and the retail store, and providing the updated feature comprises providing a promotion identifier and a campaign identifier together with the updated feature.

9. The computer-implemented method of claim 1, wherein the selected fractional portion may include a 0%, a 25%, a 50%, a 75%, or a 100% of the digital content, and further wherein providing the updated feature comprises updating a feature according to the selected fractional portion.

10. The computer-implemented method of claim 1, further comprising identifying an impression parameter in the pixel script and verifying that the impression parameter is true, prior to requesting the client device to print a coupon for the consumer.

11. A system, comprising:
a memory circuit storing multiple instructions; and
one or more processors configured to execute the instructions and cause the system to:

provide, from a host server to a user of a creative rendering application preparing a digital content for a consumer, an option menu for an event trigger, the option menu comprising: a completion, from a start of the digital content, of a portion larger than a selected fractional portion of the digital content, a start of a banner content, a consumer action on a consumer mobile device, including at least one of a play action, a pause action, a mute action, an unmute action, and a click on a highlighted portion of the digital content;

receive in the host server, from the user of the creative rendering application, a selection of the event trigger from the option menu;

configure the event trigger in a pixel script based on the selection of the event trigger from the option menu;

provide, to the consumer in a consumer mobile device, the digital content to be displayed on the consumer mobile device, the digital content associated with a consumer packaged good;

verify that the event trigger is activated by the pixel script in the consumer mobile device when the digital content is displayed on the consumer mobile device;

request, upon verification that the event trigger is activated by the pixel script in the consumer mobile device, a non-personally identifiable information from a consumer in the pixel script of the digital content;

modify a consumer account based on the non-personally identifiable information, and on the event trigger being activated;

identify at least one retail store that includes the consumer packaged good when a location of the consumer indicates that the consumer is within the at least one retail store and when the event trigger is activated by the pixel script in the consumer mobile device;

provide an updated feature of the consumer account to a retail store when a configured rule in the pixel script is satisfied; and in response to the consumer being within the at least one retail store and to the event trigger being fired, request a client device to print a personalized coupon for the consumer based on the updated feature of the consumer account.

12. The system of claim 11, wherein to modify a consumer account the one or more processors execute instructions to provide the event trigger and the non-personally identifiable information to a digital coupon and promotion technology engine.

13. The system of claim 11, wherein the updated feature includes digital promotions, offers, and coupons associated with the consumer packaged good and the retail store.

14. The system of claim 11, wherein the one or more processors execute instructions to request the retail store to print a coupon for the consumer based on the updated feature, when the consumer is in the retail store.

15. The system of claim 11, wherein the selected fractional portion may include a 0%, a 25%, a 50%, a 75%, or a 100% of a stream of the digital content, and further wherein to provide the updated feature the one or more processors execute instructions to update a feature according to the selected fractional portion.

* * * * *